Aug. 18, 1942.　　　S. M. ABBOTT　　　2,293,094
MEAT-TENDERING MACHINE
Filed April 25, 1941　　　2 Sheets-Sheet 2
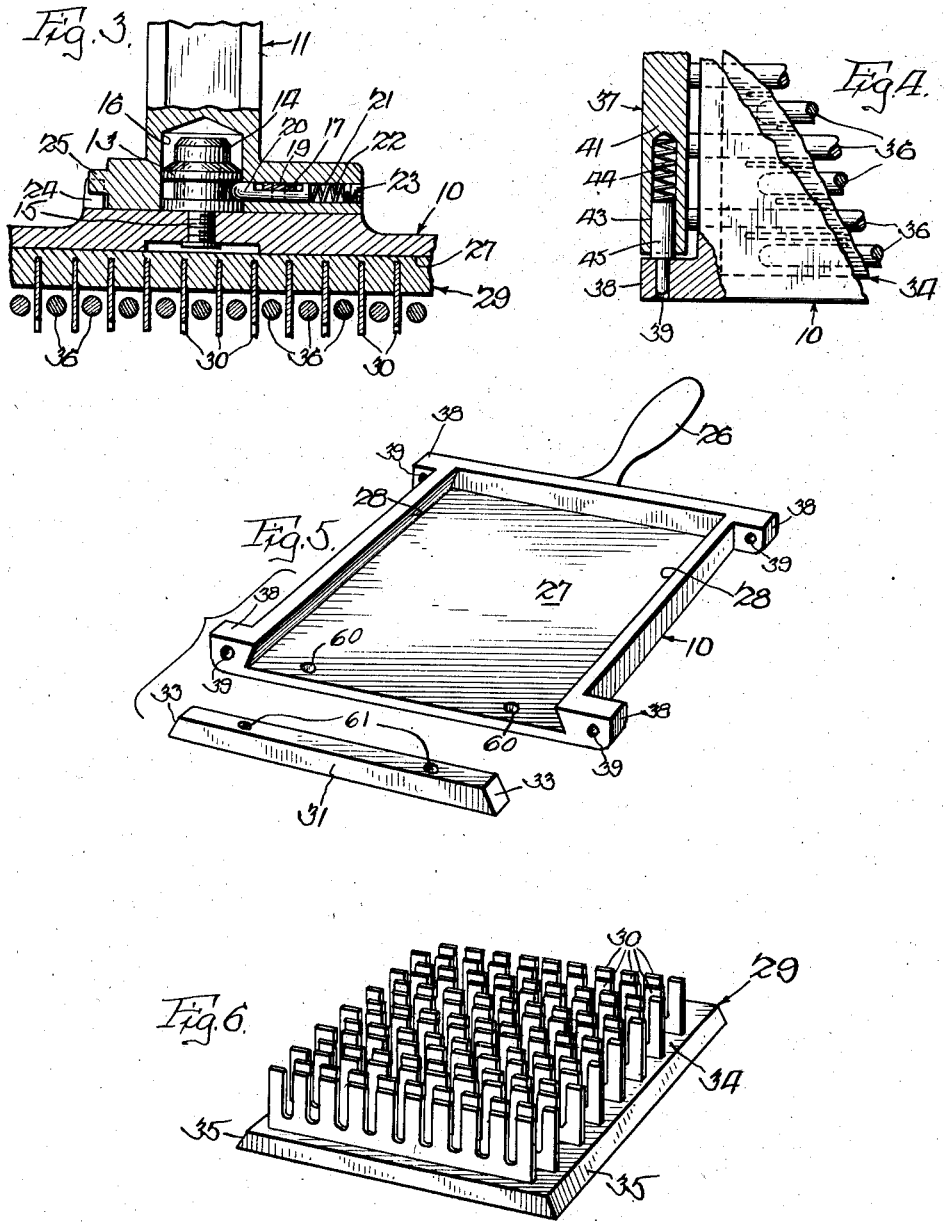

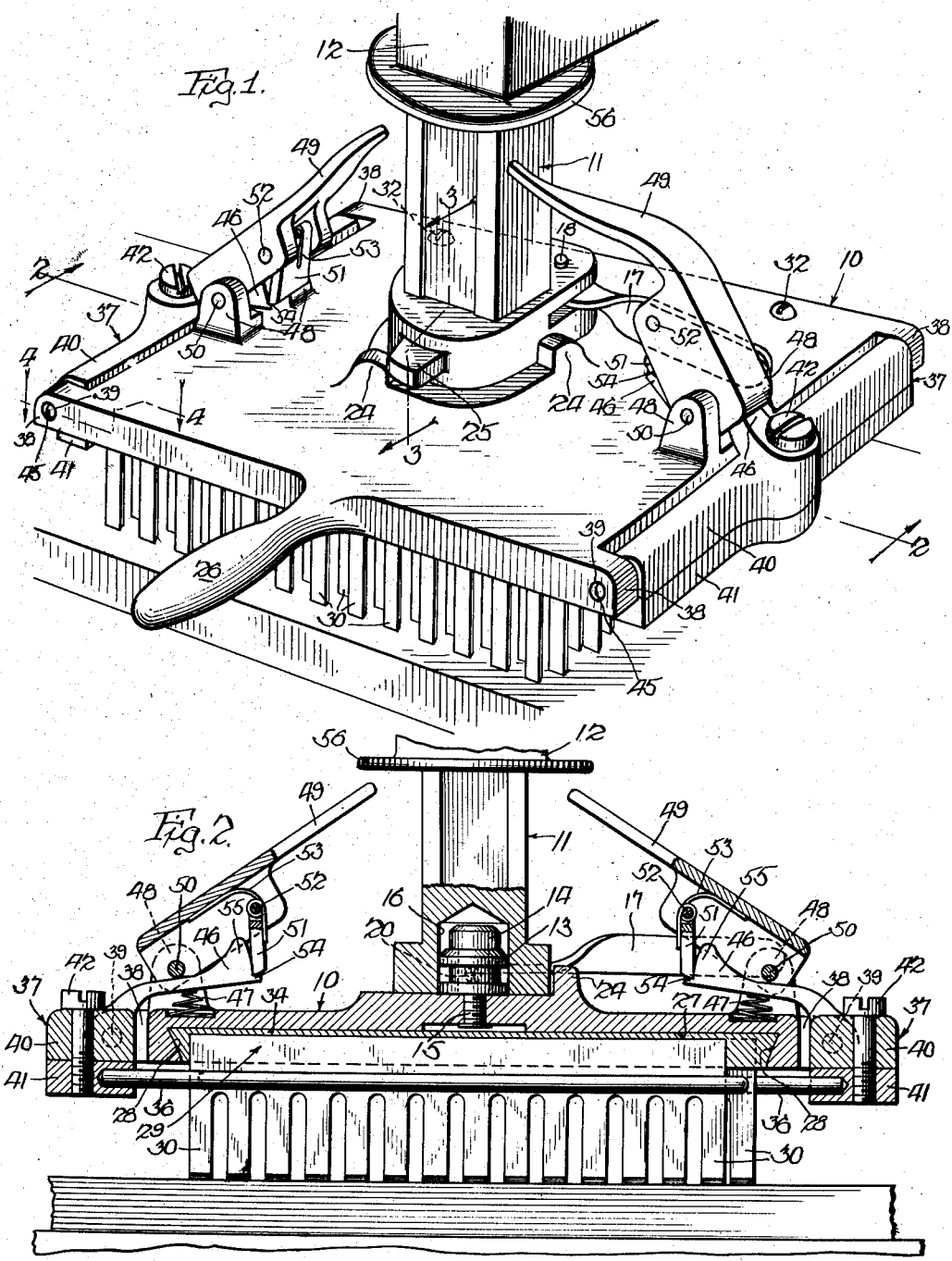

Patented Aug. 18, 1942

2,293,094

UNITED STATES PATENT OFFICE 2,293,094

MEAT-TENDERING MACHINE

Scott M. Abbott, Chicago, Ill., assignor to Tenderet Corporation, Chicago, Ill., a corporation of Illinois Application April 25, 1941, Serial No. 390,225

1 Claim. (Cl. 17—25)

The present invention relates to improvements in a meat tendering machine, and is directed to the cutting head employed with such machines, and more particularly to the removable cutting knives carried by the head.

The type of cutting head illustrated is arranged to be rotatively suspended on a vertically movable ram to bring the cutting knives against a wooden surface on which the meat is placed to be treated. When the cutting head is forced downwardly, the cutting knives penetrate the meat, and when raised, the meat is automatically ejected from the cutting knives by stripper means carried on the cutting head and operable upon each upward movement of the cutting head, as disclosed in the patent to John C. Hintz, No. 2,061,799, and dated November 24, 1936.

The above is a brief description of the type of cutting head to which my improvements are directed, and it is an object of the present invention to provide a cutting head that is rotatively supported and easily removed from the machine, and which cutting head carries a plurality of cutting knives which may be bodily removed for the purpose of cleaning, sharpening or replacing them.

A further object is the provision of a cutting head constructed to retain a plurality of cutting knives assembled as a unit, and which unit is bodily placed in and rigidly secured to the cutting head.

Further objects and advantages are details of construction, such as the removable cutting head and the means for readily removing the stripper means for rendering the cutting knives accessible to be quickly and easily removed from the cutting head.

Other objects and advantages of the invention will become apparent from the following detailed description of the preferred embodiment illustrated in the accompanying drawings in which:

Figure 1 is a perspective view illustrating a cutting head embodying my invention.

Figure 2 is a cross-sectional view taken substantially on the line 2—2 of Fig. 1.

Figure 3 is a detail cross-sectional view illustrating the means for attaching and releasing the cutting head from the machine, taken on the line 3—3 of Fig. 1.

Figure 4 is a partial detail plan view partly broken away to illustrate the spring pins pivotally supporting the stripper means on the cutting head, and taken on the line 4—4 of Fig. 1.

Figure 5 is a perspective view showing the under side of the cutting head, illustrating the cavity therein and the retaining bar removed therefrom.

Figure 6 is a detail perspective view illustrating the cutting knives arranged as a unit and insertable in the cavity of the cutting head.

The cutting head embodying the invention is designated as 10, and as illustrated in Figs. 1, 2 and 3, is removably attached to a ram 11 which is slidably carried for vertical movements in the head 12 of the meat tendering machine.

The cutting head 10 is provided centrally of its top surface with a grooved roller 13 pivotally carried by a stud 14 threaded into the cutting head at 15, and this roller 13 and stud 14 are adapted to fit into a bore 16 provided in the ram 11. The ram 11 also carries a horizontally manually manipulative lever 17 pivoted thereon at 18 and with one end of the lever pivotally connected at 19 to a pin 20 slidably carried in a bore 21 provided in the ram, and which pin is urged inwardly of the bore by a spring 22 retained in place by a screw 23. The spring 22 exerts a pressure against the pin 20 to force the same into the grooved roller 13 carried on the cutting head 10, and the lever 17 is for the purpose of effecting movement of the pin 20 out of the grooved roller 13 for releasing to remove the cutting head 10 from the ram 11.

When the cutting head 10 is attached to the ram 11, it may be bodily turned approximately 90°, being limited in either direction of its turning movements by a pair of ears 24—24 provided on the cutting head engaging a lug 25 carried by the ram 11. A handle 26 extends outwardly on the front edge of the cutting head 10 and is for the purpose of manually turning the cutting head to the desired angle when a piece of meat is being treated.

The under surface of the cutting head 10 is provided with a cavity 27 which has opposite side edges 28—28 thereof converging to form a dovetail therebetween (Figs. 2 and 5), to receive a unit 29 comprising a plurality of cutting knives 30 (Fig. 6), and which unit is retained in position in the cavity 27 of the cutting head 10 by means of a retaining bar 31. This retaining bar 31 is secured to the cutting head 10 by means of screws 32 (Fig. 1), and each end of the retaining bar is bevelled at 33—33 to conform with and snugly fit between the opposite edges 28 of the cavity 27.

The unit 29 comprises a base 34 which may be of any suitable construction, but which as shown, is preferably molded to rigidly retain the plurality of cutting knives 30 therein in parallel relation with each other and staggered with respect to their longitudinal axis (Fig. 6), and opposite side edges 35—35 of the base 34 are bevelled to conform with the opposite side edges 28—28 of the cavity 27 in the cutting head to be slidably positioned therein.

The cutting knives 30 are spaced a sufficient distance apart to receive therebetween rods 36 of oppositely directed stripper means, each designated as a whole as 37, and which are each pivotally carried between a pair of outwardly projecting portions 38—38 provided on opposite side edges of the cutting head 10 and having aligned bores 39 therein. Each of the stripper means 37 comprises a bar 40 and a plate 41 secured thereto by a screw 42. The bars 40 have a bore 43 in each end thereof (Fig. 4) into which a spring 44 and a pin 45 are carried for the purpose of pivotally supporting the stripper means between the portions 38—38, and these pins 45 and springs 44 provide means whereby the stripper means may be quickly and easily removed from the cutting head 10 by inserting a nail or other means into the bores 39 to force the pins 45 inwardly against their springs 44.

Each bar 40 of the stripper means 37 has an inwardly directed extension 46 which overlies the top surface of the cutting head 10 and a compression spring 47 is interposed therebetween for retaining the bar 40 and plate 41 in raised position with the rods 36 carried thereby in close proximity with the under surface of the cutting head. The cutting head is provided at opposite edges of its top surface intermediate the projections 38—38 with a pair of upwardly extending ears 48—48 between each of which pairs of ears is carried an inwardly and angularly directed arm 49 pivoted at 50, and each of these arms 49 carries a depending trip arm 51 pivoted thereon at 52, and with the free end of the trip arm urged into engagement with the extension 46 of the stripper means by a spring 53. The extension 46 of the stripper means has its free end formed to provide a seat 54 which receives the depending end of the trip arm 51 and is provided adjacent the seat 54 with an upwardly extending arcuate portion 55 which serves to force the trip arm 51 off of the seat 54 when the stripper means are actuated as the ram 11 is carried upwardly and the arms 49 engage an annular flange 56 on the head 12 of the machine.

It will be noted that a cutting head 10 arranged as above described, can be easily dismantled for the purpose of removing to clean, sharpen or replace the cutting knives. This is accomplished by first removing the cutting head from the machine by holding the handle 26 and exerting a pressure on the lever 17 which draws out the pin 20 from the grooved roller 13. After removing the cutting head 10, it is only necessary to remove the plate 41 with the rods 36 thereon, by merely removing the screws 42—42, and, when removed, the unit 29 is then accessible.

In order to remove the unit 29 from the cutting head 10, the screws 32 are removed from holes 60 in head 10 and from threaded holes 61 in bar 31 (see Fig. 5), which renders the retaining bar 31 free to be removed, and at which time, the unit 29 may be slidably removed from the cavity 27. This unit 29 is preferably cast to provide a base 34 with the cutting knives 30 cast therein, so as to be rigidly held and properly spaced in staggered relation with respect to their longitudinal axes and the two opposite bevelled side edges 35—35 of the base are cast or otherwise formed thereon. The knives of the unit 29 provide a discontinuous cutting edge and when staggered as above described, serve to cut the tendons and ligaments of the meat without completely severing the meat into small pieces.

I claim:

A machine of the class described comprising, in combination, a reciprocable ram having a bore in the lower end thereof, a cutting head removably pivoted to the end of said ram, a unit having a plurality of cutting knives therein and secured to the bottom of said cutting head, a grooved roller pivoted on the top surface of said cutting head and adapted to extend into said bore, a spring-urged pin on said ram engaging said grooved roller, and a lever pivotally carried on said ram and having one end operatively connected to said spring-urged pin.

SCOTT M. ABBOTT.